(12) United States Patent
Bussard

(10) Patent No.: US 6,351,211 B1
(45) Date of Patent: Feb. 26, 2002

(54) BRAKE WARNING METHOD AND SYSTEM

(75) Inventor: W. Brooks Bussard, Dallas, TX (US)

(73) Assignee: M&P Ventures, Inc., Dallas, TX (US)

( * ) Notice: Subject to any disclaimer, the term of this patent is extended or adjusted under 35 U.S.C. 154(b) by 0 days.

(21) Appl. No.: 09/490,508

(22) Filed: Jan. 25, 2000

(51) Int. Cl.$^7$ ................................................. B60Q 1/50
(52) U.S. Cl. ...................... 340/468; 340/467; 340/479; 340/472; 340/466; 340/441; 340/438
(58) Field of Search ................................ 340/467, 468, 340/453, 479, 471, 472, 441, 466, 438

(56) References Cited

U.S. PATENT DOCUMENTS

| | | | | |
|---|---|---|---|---|
| 3,813,664 A | * | 5/1974 | Geyer | 340/248 R |
| 3,868,629 A | * | 2/1975 | Caine | 340/104 |
| 5,481,243 A | * | 1/1996 | Lurie et al. | 340/467 |
| 5,495,243 A | * | 2/1996 | McKenna | 340/902 |
| 6,081,188 A | * | 6/1998 | Kutlucinar et al. | 340/438 |
| 5,825,283 A | * | 10/1998 | Camhi | 340/438 |
| 5,828,319 A | * | 10/1998 | Tonkin et al. | 340/903 |
| 6,094,148 A | * | 10/1998 | Henry et al. | 340/902 |
| 5,847,513 A | * | 12/1998 | Host | 315/80 |
| 5,850,177 A | * | 12/1998 | Zimmerman | 340/479 |
| 6,020,514 A | * | 2/2000 | Robert | 340/467 |

\* cited by examiner

*Primary Examiner*—Jeffery Hofsass
*Assistant Examiner*—Hung Nguyen
(74) *Attorney, Agent, or Firm*—Jackson Walker L.L.P.

(57) ABSTRACT

A described embodiment of the invention is known as a brake strobe system (BSS) providing a state of the art visual warning system designed to prevent accidents and multi-car pileups. When a driver quickly and forcefully applies his brakes, a strobe light (which is built into the third brake light or all brake lights) is activated. The harder a driver brakes, the faster and brighter the strobe blinks, thereby warning other drivers of potential hazards. The BSS also has the ability to brighten or dim the strobe to compensate for weather and day or night driving conditions. It also has the ability to change modes or presets according to the speed of the vehicle. In the event that a car's airbag deploys, the brake strobe system will automatically activate to warn other drivers and alert emergency response personnel. Also included is a manual on/off feature to augment the car's hazard lights (which vary in speed and intensity according to the vehicle's speed) and provide better visibility and safety for roadside stops or other emergencies. Since the strobe is activated when the hazards are on or the airbag is deployed, it will also trigger the optional audible alert system.

3 Claims, 5 Drawing Sheets

# BRAKE WARNING METHOD AND SYSTEM

BACKGROUND OF THE INVENTION

Technical Field

The present invention relates to a method and system for providing a warning indication that a vehicle is decelerating. More specifically, the invention relates to a system for providing an indication to following vehicles of the rate of deceleration of a vehicle.

Description of the Related Art

When a driver applies his brakes, other drivers have no way of knowing how forcefully that person is braking. Under the best conditions, it requires excellent depth perception to determine how quickly a car is decelerating. Many rear-end collisions could be prevented with a visual warning system that would allow a driver to accurately determine how fast the vehicle in front of him is braking.

Several systems in the prior art have attempted to address this problem. However, none have provided an effective solution. For example, Zimmerman (U.S. Pat. No. 5,850,177) provides a system that causes the brake lights to flash when the anti-lock braking system (ABS) engages. It is likely that the driver is attempting a rapid stop when the ABS engages, but there is no direct correlation. ABS engages when the ABS sensors detect that a wheel of the vehicle is not spinning. The vehicle may be attempting to stop on a slick surface. Thus, the vehicle may be decelerating at a normal pace.

Lurie et al. (U.S. Pat. No. 5,481,243) shows a system with an optical rotation sensor to determine deceleration. This provides a more accurate sensing of deceleration that the ABS system, but it assumes the rotation of the wheels is translated into stopping force. This may or may not be true. Thus the system of Lurie et al. may provide a false indication of the stopping force being applied. In addition, the system of Lurie et al. includes a provision for a special indicator for quick stops, but only provides a threshold indication of when a stop is "quick." Thus, the driver behind a vehicle with the system of Lurie et al. does not have an accurate indication of the force of braking being applied. In addition, the signaling system of Lurie et al. uses a red/yellow/green target shaped signal to indicate stopping quickness. However, this signal is easy to overlook and useless to colorblind drivers.

There is a need for a system that provides an accurate indication of the braking force being applied to indicate the urgency of the braking. In addition, there is a need for a system that provides a warning to a trailing driver that the preceding vehicle is braking urgently.

BRIEF SUMMARY OF THE INVENTION

It is an object of the present invention to provide a braking warning system that gives an accurate indication to succeeding vehicles how urgently the preceding car is braking.

It is an additional object to provide a highly visible warning to succeeding cars of braking by preceding vehicles.

It is an additional object to provide a warning signal that provides a clear indication of the deceleration of the vehicle.

It is another object of the present invention to provide a warning signal within a succeeding vehicle that a preceding vehicle is urgently braking.

It is yet another object of the present invention to provide a system indicating the location of a plurality of urgently braking vehicles and providing a warning to vehicles on the same road that a traffic obstruction is impending.

These and other objects of the present invention are provided by the described embodiments of the present invention. One embodiment of the invention is a brake strobe system (BSS) providing a state of the art visual warning system designed to prevent accidents and multi-car pileups. When a driver quickly and forcefully applies his brakes, a strobe light (which is built into the third brake light or all brake lights) is activated. The harder a driver brakes, the faster and brighter the strobe blinks, thereby warning other drivers of potential hazards and the deceleration of the vehicle. When the vehicle is stopped, the BSS will continue to blink until the driver lifts his/her foot from the brake or another vehicle pulls in behind the BSS equipped vehicle. The BSS has the ability to brighten or dim the strobe to compensate for weather conditions and day or night driving conditions. It also has the ability to change modes or presets according to the speed of the vehicle.

The brake strobe system includes at least a light bulb and a processor. The light bulbs used in the BSS are usually Xenon or LEDs. These types of bulbs are bright, reliable, have quick response times and good focusing characteristics. The processor serves three purposes: on-off switch, speed control and intensity control. The processor has the ability to receive information from multiple sensors. The most common types of sensors include: brake line pressure, deceleration, proximity, a global positioning device, temperature and light (i.e. a photo sensor). The processor then processes this information and determines how quickly and intensely the light bulb should blink. Because the preferred types of light bulbs have good focusing characteristics, drivers who are not directly behind the vehicle are not distracted. Focusing the light bulb also proves useful for triggering optional alerts on the following car. The audible alert has the ability to monitor the braking rate of the vehicle in front via its strobe signal, or by monitoring infrared or radio frequency signals, if such signals are provided from the leading vehicle. If the driver does not apply his brakes within a certain amount of time, a warning alarm will start to beep at, for example, the rate of the received strobe signal until the brakes are applied.

In the event that a car's airbag deploys, the brake strobe system will automatically activate and provide a flashing signal to warn other drivers and alert emergency response personnel. Also included is a manual on/off feature to augment the car's hazard lights (which vary in speed and intensity according to the vehicle's speed) and provide better visibility and safety for roadside stops or when the vehicle is traveling under emergency circumstances. Since the strobe is activated when the airbag is deployed, it will also trigger the optional audible alert system.

Another embodiment of the present invention includes a braking force sensor for sensing braking force of the first vehicle, the braking force sensor and other sensors provide a deceleration force signal indicating the rate of braking force of the vehicle. A strobe circuit is connected to receive the deceleration force signal and the strobe circuit provides a digital signal having a flashing frequency that varies in response to the braking force signal. An illumination device is connected to receive the digital signal and provides a visual indication of the rate of braking force of the motor vehicle. The illumination device provides an illumination signal at the frequency of the digital signal. A photo sensor positioned on the succeeding vehicle receives the illumination signal and converts it into a warning signal. A detector is connected to receive the warning signal and determines when the first vehicle is decelerating. A warning is provided when the detector determines that the deceleration force being applied by the preceding vehicle is above a certain threshold and is proximate to the following vehicle.

The foregoing has outlined some of the more pertinent features of the present invention. These should be construed to be merely illustrative of some of the more prominent features and applications of the invention. Many other beneficial results can be attained by applying the disclosed invention in a different manner or by modifying the invention as will be described. Accordingly, a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
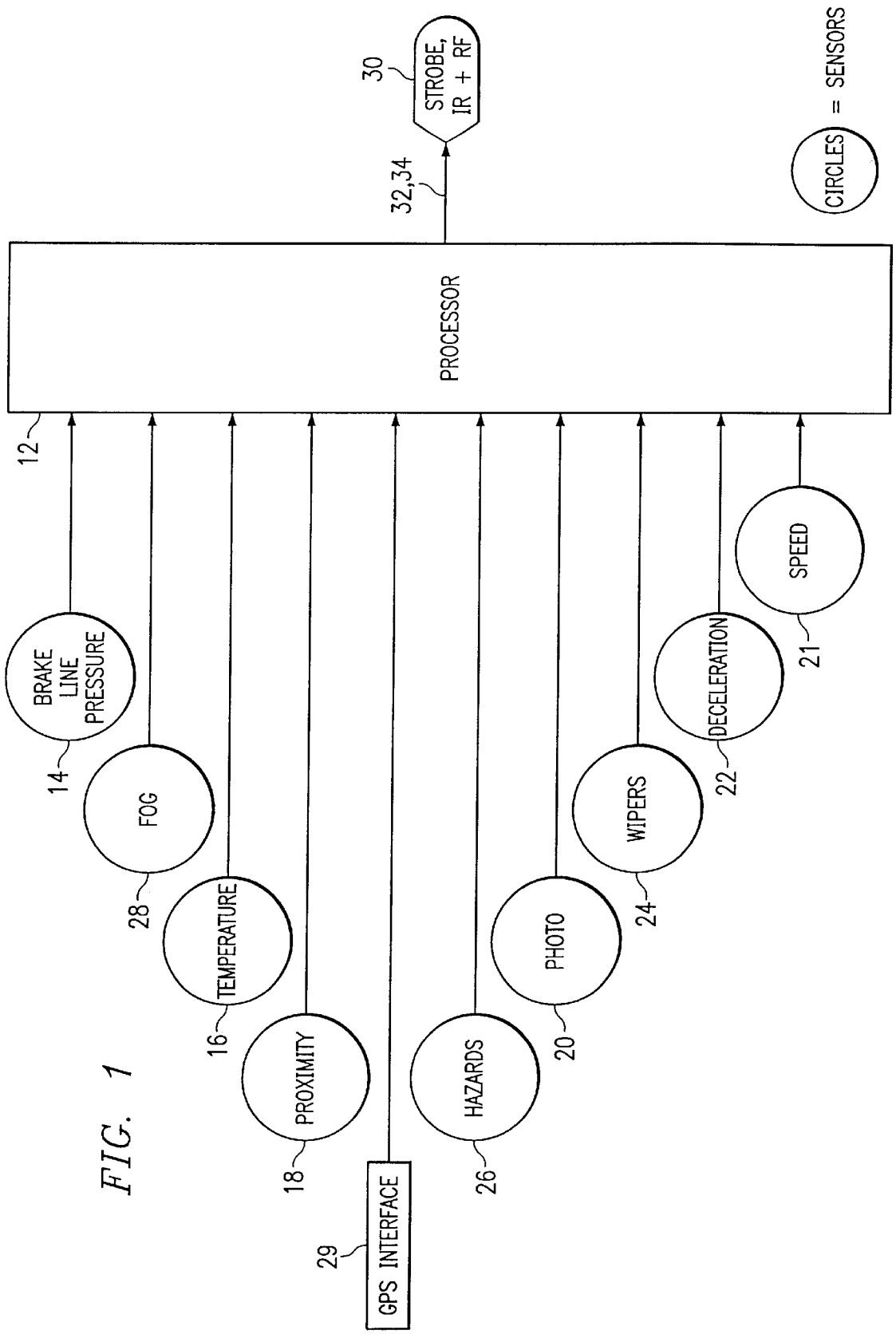
FIG. 1 is a block diagram of one embodiment of the present invention.

FIG. 1 is shows a preferred embodiment of the present invention. Processor 12 is preferably a microcontroller based control unit. It includes a programmable read-only memory for storage of its operating program and related algorithms. In addition, it includes random access memory for interim calculations and program operation. Processor 12 receives input signals from brake line pressure sensor 14, temperature sensor 16, proximity sensor 18, photo sensor 20, deceleration sensor 22, windshield wiper switch 24, hazard light switch 26 and fog light switch 28. Of course, other sensors may be advantageously used as will become apparent to those skilled in the art in light of this specification.

Brake line pressure sensor 14 is connected via a fluid coupling to measure the internal brake line pressure. Most vehicles use a hydraulic system to transfer the pressure from the driver's foot to the brake pads. This is often supplemented by a power brake system that adds power from the engine roughly in proportion to the pressure applied by the driver. Brake line pressure sensor 14 provides the most direct reading of the nature of the stop because the brake line pressure is a direct indication of how forcefully the driver is trying to stop. Temperature sensor provides an ambient temperature reading for the calculations by the processor 12. Warmer temperatures require additional brake pad pressure for the same stopping force. Therefore, the driver will press harder to compensate for the diminished friction of the brake pads in warmer weather.

Proximity sensor 18 is, for example, a radio frequency or infrared radar positioned on the rear of the vehicle. Proximity sensor 18 determines if there is a trailing vehicle and, if so, how far back it is trailing. This information can be used, for example, to dim the brake lights and turn off the warning illumination device (explained below) if the trailing vehicle is close. This avoids hurting the trailing driver's vision by glare, or worse, temporarily blinding the trailing driver.

Photo sensor 20 provides a signal indicating ambient light. This allows for dimming of the warning device at nighttime. Deceleration sensor 22 provides an indication of how quickly a vehicle is decelerating. Deceleration sensors are commonly available automotive components. In another embodiment, deceleration data is derived from the speed of the vehicle as monitored relative to time. They are most often used in air bag crash sensors and anti-lock braking systems. Wiper switch 24 provides a signal indicating whether the windshield wipers are on and, if so, at what speed. This provides an indication of whether it is raining and the rain's intensity. In another embodiment, global positioning data is used in conjunction with weather data provided over a wireless network. Global positioning sensor 29 provides the position of the vehicle using the Global Positioning System (GPS). The position and weather data allow for a relatively precise indication of the weather conditions encountered by the vehicle. The embodiment of FIG. 1 includes input from hazard light switch 26. Fog light switch 28 provides a signal to processor 12 indicating whether the fog lights are on or off.

In another embodiment, a direct fog sensor may be used. An example of such a sensor is a light source and photo sensor opposite a gap where ambient air is allowed to enter. Fog, rain and other precipitation will partially interrupt the path of the light from the light source to the sensor. Thus, changes in the sensor signal provide an indication of the ambient conditions.

Processor 12 combines the above signals to provide two signals to strobe circuit 30. The stop deceleration signal 32 provides a signal proportional to the urgency of the braking of the vehicle. Preferably, stop deceleration signal 32 is provided to strobe 30 as a digital number. Processor 12 analyzes the inputs it receives to determine if there is a stop and its deceleration level. The primary factor is the brake line pressure sensor. The specific algorithm used to determine the threshold of an urgent stop is dependent upon the vehicle. If there is an urgent stop detected, stop deceleration signal 32 is a number proportional to the urgency of the stop. An important factor in this stop deceleration determination is the brake line pressure. Strobe circuit 30 also receives a dimmer signal 34.

Figure 2A:
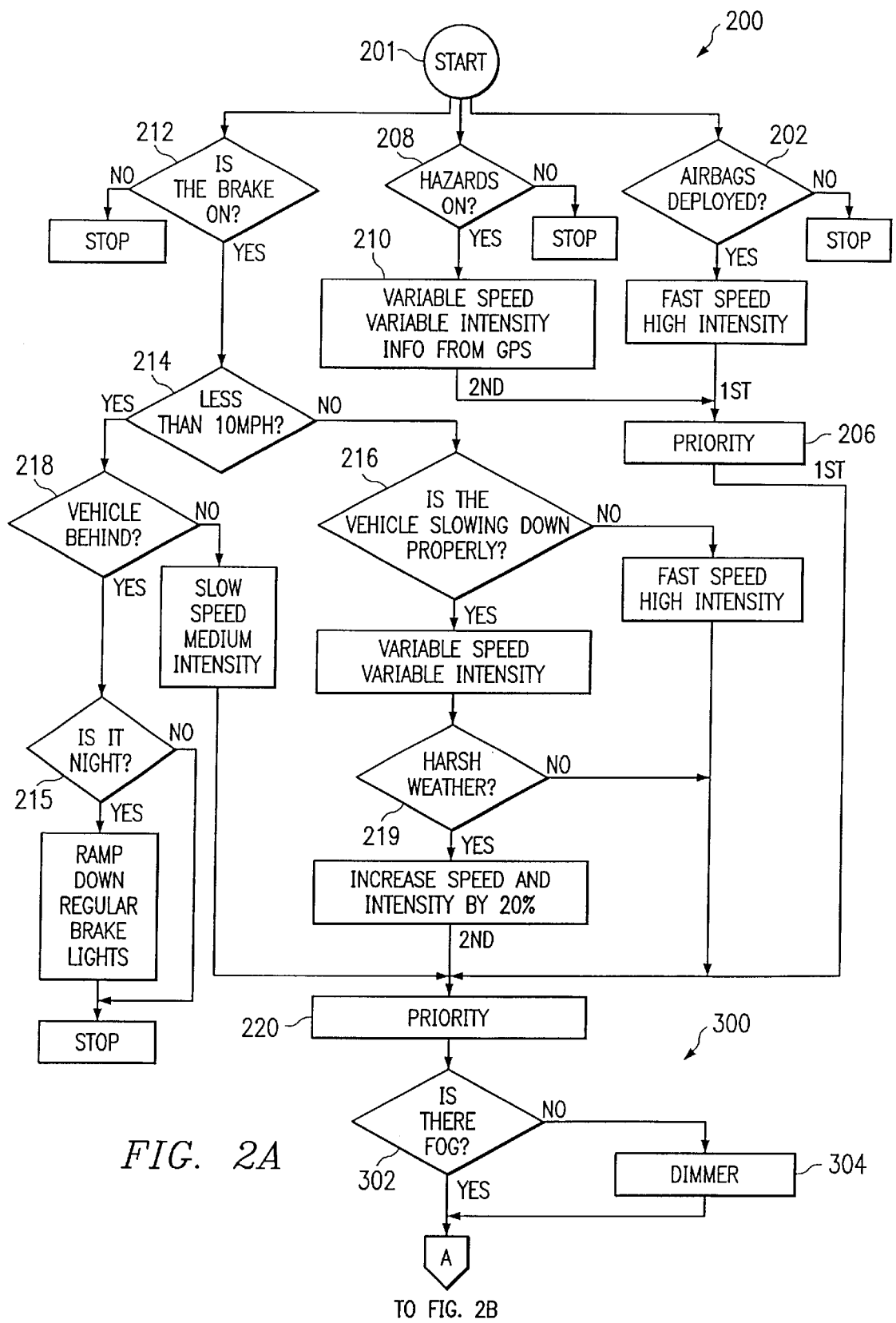
FIG. 2 is a flow chart depicting the operation of the embodiment of FIG. 1.
Figure 2B:
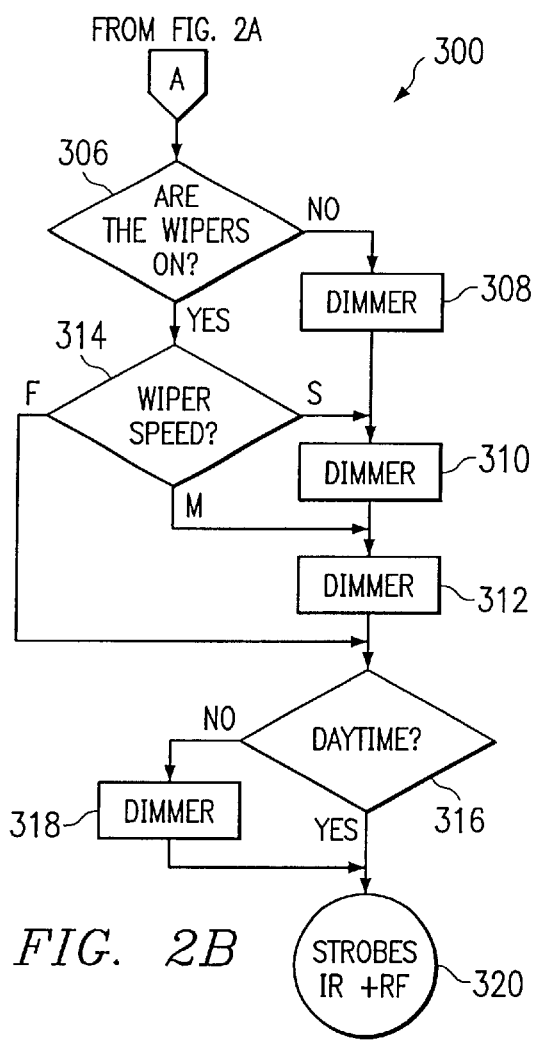

Stop deceleration signal 32 and dimmer signal 34 are determined using a process illustrated by the flowchart of FIG. 2. The stop deceleration signal is primary to the dimmer signal. The stop deceleration signal is determined using process 200. From starting point 201, the process includes three concurrent branches. The first branch begins with step 202, which determines if the vehicle's airbag has deployed. If so, preferably a fast rate digital signal 32 along with a high intensity signal 34 are provided to strobe circuit 30. This branch takes priority over the other branches as indicated at priority branch 206.

The second branch of the process determines if the hazard lights are on at step 208. If the hazard lights are on, it is determined at step 210 if the vehicle is traveling less than, for example, 20 miles per hour under the speed limit by comparing the speed of the vehicle to the posted speed limit as determined by the global position of the vehicle. If so, a high speed deceleration signal 32 along with a high intensity signal 34 are generated. If not, a medium speed signal 32 is generated along with a medium intensity signal 34. The results of this branch may be overridden by the results of the first branch. In another embodiment, the frequency of the signal continuously varies with the speed of the vehicle. In yet another embodiment, the brightness of the brake lights themselves is modified according the speed of the vehicle, the deceleration level and the proximity of a trailing vehicle.

A third branch of the system is triggered directly by brake activity. At step 212, it is determined if the brake is depressed. The primary method for determining if the brakes are depressed is the brake line pressure sensor 14 (FIG. 1). Other means for determining the brake's status may also be advantageously used. For example, sensors in the brake pedal and/or emergency brake mechanism may be used. If the brakes have been depressed, it is determined at step 214 if the vehicle is traveling at greater than, for example, ten miles per hour. This number is chosen as a threshold where the vehicle is nearly stopped. Deceleration is tested at step 216. If the vehicle is not slowing down properly, a high stop deceleration signal 32 is generated along with a high intensity signal 34. This indicates that the vehicle that there is a problem with decelerating the vehicle (e.g. if the wheels are slipping). In a preferred embodiment, if the vehicle is decelerating, a variable speed signal 32 is generated along with a variable intensity signal 34. This signal may vary according to the brake line pressure or in proportion to the vehicle's deceleration.

If the vehicle is traveling less than ten miles per hour, it is determined at step 218 if there is a vehicle trailing using proximity sensor 18. If no vehicle is trailing, a medium speed signal 32 along with a medium intensity signal 34 is provided. If there is a vehicle trailing, no signal 32 is provided. If a variable speed, variable intensity signal is selected, it is determined at step 219 if harsh weather conditions exist using fog sensor 28 (or using wiper sensor 24, temperature sensor 16 or GPS weather data). If harsh weather exists, both the speed and the intensity of the signal are increased 20%.

If there is a trailing vehicle, it is determined at step 215 if it is night using photo sensor 20. If it is night and there is a trailing vehicle in close proximity, the standard brake lights (not the strobe) are ramped down to a dimmer setting using a control signal to a brake light dimming circuit (not shown). This helps to avoid glare to the driver of the trailing vehicle. These signals may be overridden by a signal generated by the first two branches as shown in step 220.

Dimmer signal 34 may be modified using process 300 in FIG. 2. Several dimming increments may be combined in the process 300. Each dimming increment causes dimming signal 34 to be reduced a selected percentage. At step 302, the fog light switch 28 is checked to see if the fog lights are on. If so, dimming increment 304 is skipped. If not, dimming increment 304 is added to the dimming total. Next it is determined if the windshield wipers are operating at step 306. If they are operating one or all of dimming increments 308, 310 and 312 are skipped, depending on the speed of the wipers determined at step 314. Next, photo sensor 20 is used to determine if it is daylight at step 316. If not, dimming increment 318 is entered. The sum of the dimming increments provides a dimming signal 34 and digital signal 32 at step 320. The process of FIG. 2 is continually repeated while the vehicle is on.

Figure 3:
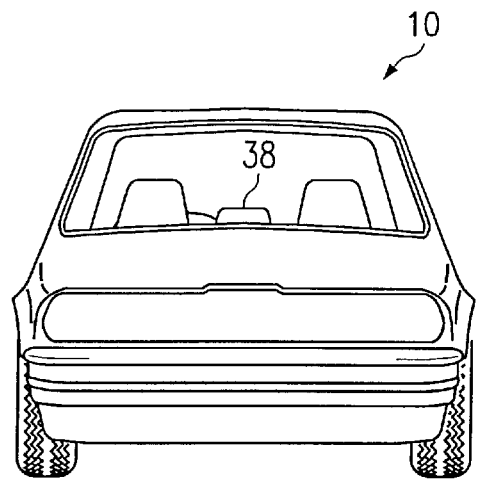
FIG. 3 is a rear view of a vehicle including an embodiment of the present invention.

Warning indicator 38 is shown mounted in vehicle 10 in FIG. 3. Warning indicator 38 is preferably positioned high and in the center of the vehicle for maximum visibility. Warning indicator 38 is preferably a highly focused directional beam directed behind vehicle 10 so that a highly visible indication can be provided to a trailing vehicle while providing a minimum of distraction to other drivers.

Figure 4:
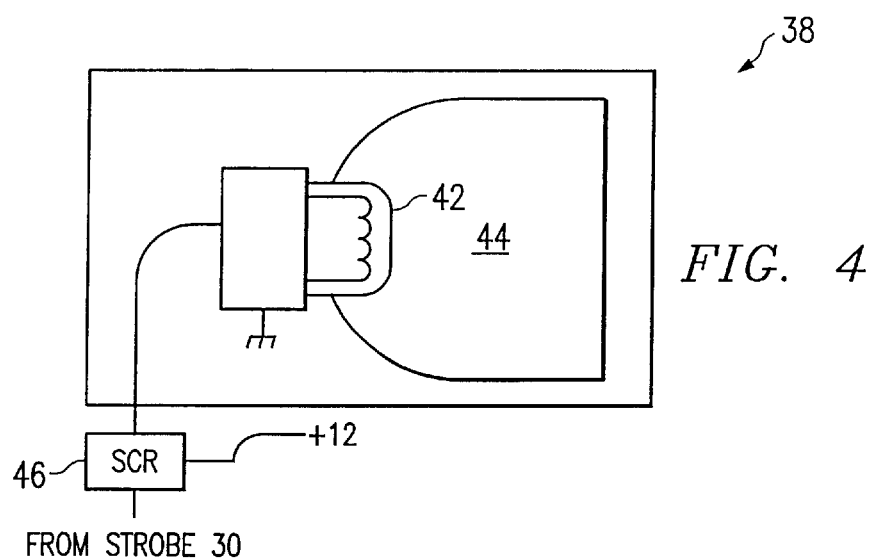
FIG. 4 is a diagram depicting a warning device suitable for used with an embodiment of the present invention.

FIG. 4 is a side view of a preferred embodiment of warning indicator 38. Lamp 42 is preferably a xenon lamp. This type of lamp is desirable for its bright light, reliability and rapid operation. However, other illumination devices may be advantageously used, such as light emitting diodes or halogen lamps. Lamp 42 is housed in a reflector 44 to focus and direct light from lamp 42. For high directionality, it is preferable that reflector 44 is a parabolic reflector.

Lamp 42 is driven electrically by a silicon controlled rectifier (SCR) 46. SCR 46 is connected to one terminal of lamp 42 and the other terminal is connected to a convenient grounding point. SCR 46 is also connected to the +12 Volt terminal of the battery (not shown) of vehicle 10. SCR 46 is controlled by a signal provided from strobe circuit 30. Strobe circuit 30 modulates the intensity and on/off frequency of light from lamp 42 according to stop deceleration signal 32 and dimming signal 34 as provided by the process of FIG. 2. In addition, strobe circuit 30 may modulate the light from lamp 42 with an encoding signal for receipt by a trailing vehicle as described below. A flashing indicator, as provided in this embodiment, provides an easily noticeable indication of the stop urgency of the vehicle. In addition, the varying frequency of the flashes is also very easy for other drivers to perceive.

Figure 5:
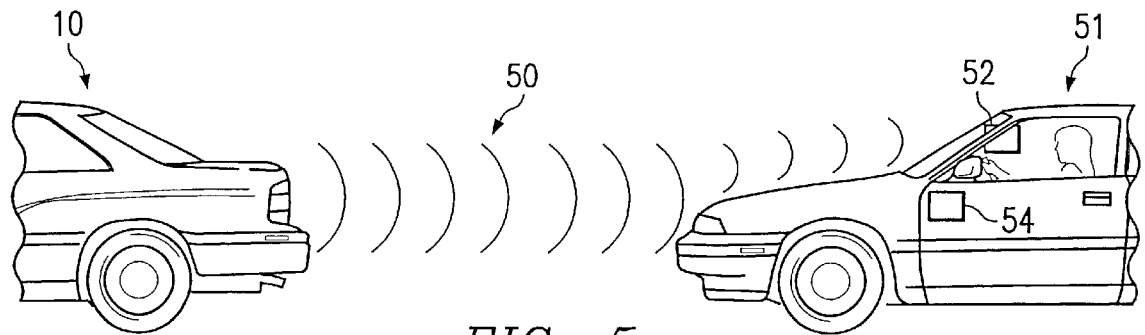
FIG. 5 is a diagram showing the operation of another embodiment of the present invention.

FIG. 5 shows another embodiment of the present invention that includes a warning device for the trailing vehicle 51. Vehicle 51 includes a photo-sensor 52 that receives the light signal 50 provided from warning indicator 38. In other embodiments, the signal 50 may be transmitted using infrared transmission or radio frequency transmission. In these other embodiments, photo-sensor 52 is replaced with an infrared detector and a RF antenna, respectively. Signal 50 is encoded with a recognition signal by modulating the signal provided from strobe 30. Sensor 50 receives the signal and compares the encoding on received signal to expected encoding. If the expected encoding is not found, the signal is assumed to be from a spurious light source and rejected. If the expected encoding is found, the flash rate is counted to determine the force of the stop indicated by warning indicator 38. From this, a signal is derived for an audible warning device 54 in vehicle 51. The "urgency" of the audible warning signal is preferably proportional to the urgency of the stop of vehicle 10. In a preferred embodiment, vehicle 51 includes a proximity sensor (not shown) to determine the proximity of vehicle 10. In addition, a speed sensor may be used in vehicle 51. Signals from these sensors are then combined to provide a more accurate indication of how urgently the driver of vehicle 51 needs to apply his/her brakes. The faster vehicle 51 is moving, the more urgent it is to stop. In addition, the need to stop is more urgent the closer vehicle 51 is to vehicle 10.

Figure 6:
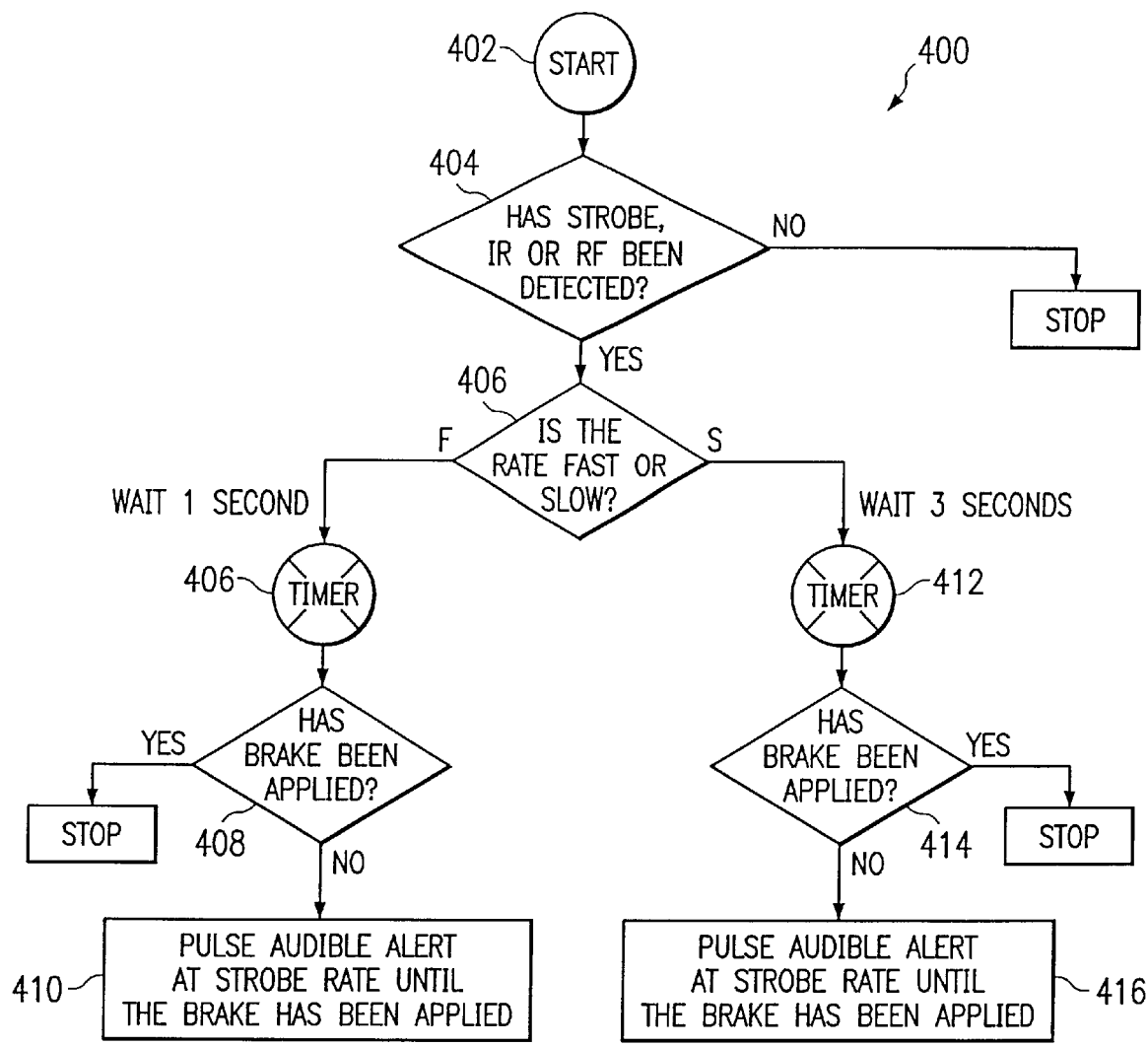
FIG. 6 is a flowchart showing the operation of the embodiment of FIG. 5.

FIG. 6 is a flow chart showing the operation of the embodiment of FIG. 6. Process 400 begins at starting point 402. At step 404, it is determined if a warning signal has been detected. If so, the process determines the speed of the signal at step 406. If the signal rate is fast, the process includes a, for example, one second delay 406 to allow for the driver of vehicle 51 to depress his/her brake. After the delay, it is determined if the brake has been applied at step 408. If not, an audible alert is provided until the brake is depressed at step 410.

If the warning signal received is slow, a delay of, for example, three seconds 412 is applied. After three seconds, it is determined if the brake has been depressed at step 414. If not, an audible alert is provided until the brake is depressed at step 416.

Figure 7:
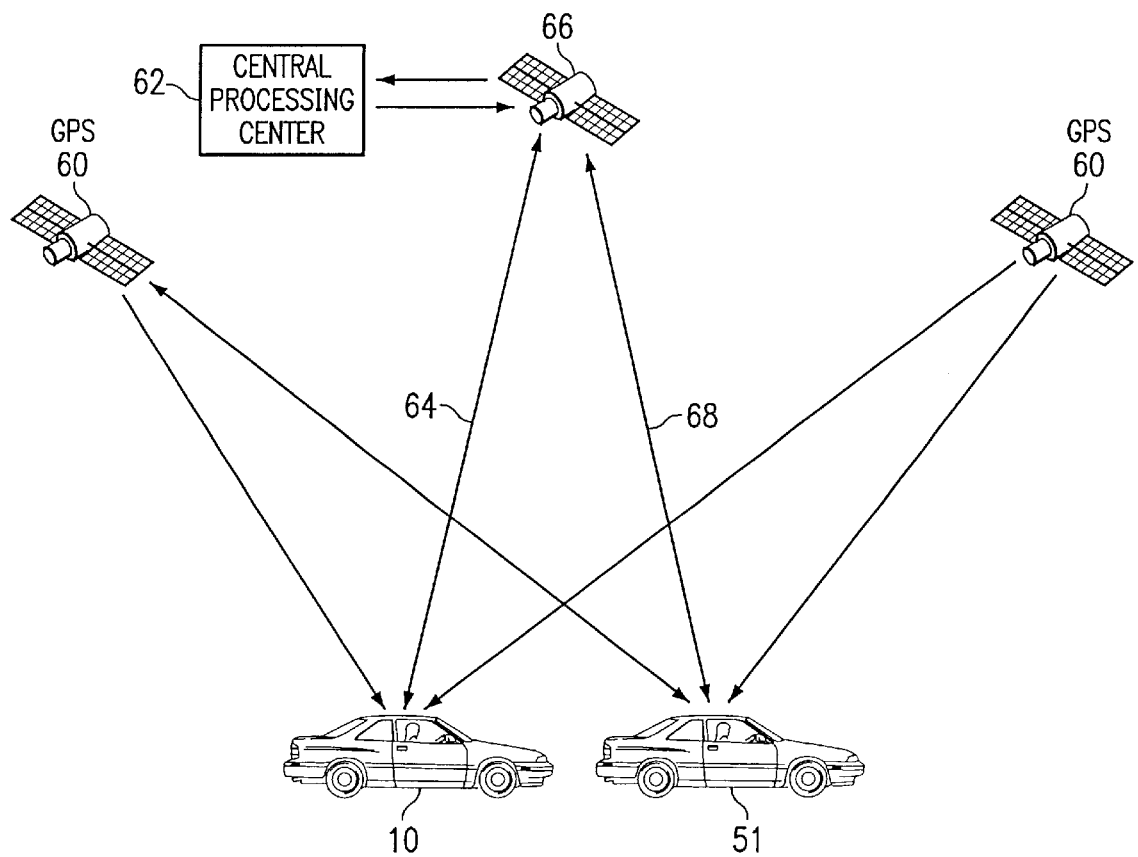
FIG. 7 is a diagram showing another embodiment of the present invention.

FIG. 7 is another embodiment of the present invention. In the embodiment of FIG. 7, vehicles 10 and 51 include receivers for receiving signals from the Global Positioning System (GPS). The geographical position of the vehicles is determined by triangulation of the GPS signals as is well known in the art. When a warning situation is determined using, for example, the process of FIG. 2, a transmitter on vehicle 10 sends a wireless signal to a central processing center 62. Processing centers may be provided on a regional or centralized basis. In the embodiment of FIG. 7, the warning signal 64 is relayed to the processing center via satellite 66. Satellite communications systems provide the greatest flexibility in that communications can be established almost anywhere. However, less costly alternatives, such as cellular transmission, may be used.

Signal 64 includes the intensity and speed of the warning, the position of vehicle 10 and its direction. From this data and data stored in a database, processing center 62 determines the road where vehicle 10 is located. A warning 68 is then broadcast to all vehicles. The warning 68 includes positioning data indicating the area of the alert. Vehicle 51 receives the signal and determines if it is in the affected area from the positioning data. If so, a warning of impending problems is indicated to the driver of vehicle 51. The embodiment of FIG. 7 is particularly useful if a number of vehicles are equipped with the warning system. If processing center 62 receives a number of warning signals from the same vicinity, there is a good possibility that there is a traffic jam at that location. Warning signals can then be sent to all equipped vehicles on the road behind the traffic jam. With a more sophisticated system, alternative routing may be provided to the driver of vehicle 51.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A braking force warning system for use in a vehicle comprising:
    a braking force sensor for sensing braking force of the vehicle, the braking force sensor providing a braking force signal indicating the rate of braking force of the vehicle;
    a processor circuit connected to receive the braking force signal, the processor circuit providing a digital signal having a frequency varying in response to the braking force signal; and
    an illumination device connected to receive the digital signal and provide a visual indication of the rate of deceleration of the motor vehicle, the illumination device illuminating at the frequency of the digital signal, wherein the processor dims or brightens the light provided by the illumination device in response to signals indicating proximity, weather, night time, fog or rain, and wherein the illumination device is dimmed in response to detection of a trailing vehicle in close proximity as determined by the proximity signal.

2. A braking force warning system for use in a vehicle comprising:
    a braking force sensor for sensing braking force of the vehicle, the braking force sensor providing a braking force signal indicating the rate of braking force of the vehicle;
    a processor circuit connected to receive the braking force signal, the processor circuit providing a digital signal having a frequency varying in response to the braking force signal; and
    an illumination device connected to receive the digital signal and provide a visual indication of the rate of deceleration of the motor vehicle, the illumination device illuminating at the frequency of the digital signal, wherein the processor dims or brightens the light provided by the illumination device in response to signals indicating proximity, weather, night time, fog or rain, and wherein at least one brake light on the vehicle is dimmed in response to detection of a trailing vehicle in close proximity as determined by the proximity signal.

3. A braking force warning system for use in a vehicle comprising:
    a braking force sensor for sensing braking force of the vehicle, the braking force sensor providing a braking force signal indicating the rate of braking force of the vehicle;
    a processor circuit connected to receive the braking force signal, the processor circuit providing a digital signal having a frequency varying in response to the braking force signal; and
    an illumination device connected to receive the digital signal and provide a visual indication of the rate of deceleration of the motor vehicle, the illumination device illuminating at the frequency of the digital signal, wherein the illumination device provides a warning signal if a hazard light is illuminated in the vehicle, and wherein the frequency and amplitude of the signal provided to the illumination device when the hazard lights are illuminated is varied in relation to the speed of the vehicle.

* * * * *